United States Patent
Calhoun, Jr. et al.

(10) Patent No.: US 10,732,054 B2
(45) Date of Patent: Aug. 4, 2020

(54) TEMPERATURE GAUGE SYSTEMS FOR REMOTELY MONITORING COOKING SESSIONS AND METHODS THERETO

(71) Applicant: NGT Enterprises, LLC, Atlanta, GA (US)

(72) Inventors: Jack J. Calhoun, Jr., Atlanta, GA (US); Noah McNeely, Lawrenceville, GA (US); Don Muntner, Lawrenceville, GA (US); Jon Schweiger, Mt Crested Butte, CO (US); Matias Ezequiel Cabrera, Atlanta, GA (US); Maximiliano Hanglin, Atlanta, GA (US); Elias Daniel Turbay, Atlanta, GA (US); Daniel Alejandro Pavon Araya, Atlanta, GA (US)

(73) Assignee: NGT ENTERPRISES, LLC, Atlanta, GA (US)

(*) Notice: Subject to any disclaimer, the term of this patent is extended or adjusted under 35 U.S.C. 154(b) by 0 days.

(21) Appl. No.: 16/150,083

(22) Filed: Oct. 2, 2018

(65) Prior Publication Data
US 2019/0101460 A1  Apr. 4, 2019

Related U.S. Application Data

(60) Provisional application No. 62/566,822, filed on Oct. 2, 2017.

(51) Int. Cl.
| G01K 13/00 | (2006.01) |
| G01K 1/02 | (2006.01) |
| G08B 21/18 | (2006.01) |
| G01K 3/00 | (2006.01) |

(52) U.S. Cl.
CPC .............. *G01K 13/00* (2013.01); *G01K 1/024* (2013.01); *G01K 1/026* (2013.01); *G01K 3/005* (2013.01); *G08B 21/182* (2013.01); *G01K 2207/06* (2013.01)

(58) Field of Classification Search
CPC ........ G01K 13/00; G01K 1/024; G01K 1/026; G01K 3/005; G01K 2207/06; G08B 21/182
See application file for complete search history.

(56) References Cited

U.S. PATENT DOCUMENTS

| 8,931,400 | B1* | 1/2015 | Allen | A47J 36/321 99/344 |
| 10,024,736 | B2* | 7/2018 | Nivala | G01K 1/024 |
| 2003/0007544 | A1* | 1/2003 | Chang | F24C 7/08 374/100 |
| 2007/0042091 | A1* | 2/2007 | Rund | G01K 7/42 426/231 |
| 2007/0215599 | A1* | 9/2007 | Kahler | G01K 7/42 219/492 |
| 2008/0031302 | A1* | 2/2008 | Rund | G01K 7/42 374/102 |
| 2012/0100269 | A1* | 4/2012 | Polt | G01K 3/04 426/231 |
| 2014/0031991 | A1* | 1/2014 | Bergman | F24F 11/30 700/276 |

(Continued)

*Primary Examiner* — Joseph H Feild
*Assistant Examiner* — Rufus C Point
(74) *Attorney, Agent, or Firm* — Troutman Sanders LLP (57) ABSTRACT

The disclosed technology includes a system operable to remotely monitor a cooking session from a remotely located computing device.

13 Claims, 9 Drawing Sheets

(56) References Cited

U.S. PATENT DOCUMENTS

| | | | | |
|---|---|---|---|---|
| 2015/0194041 | A1* | 7/2015 | Allen | G08B 21/182 340/584 |
| 2016/0164310 | A1* | 6/2016 | Juntunen | H02J 7/007 320/134 |
| 2016/0377490 | A1* | 12/2016 | Nivala | G01K 1/024 374/155 |
| 2017/0300025 | A1* | 10/2017 | Moore | G05B 19/0426 |
| 2018/0077741 | A1* | 3/2018 | Pan | H04W 4/80 |

* cited by examiner

TEMPERATURE GAUGE SYSTEMS FOR REMOTELY MONITORING COOKING SESSIONS AND METHODS THERETO

CROSS-REFERENCE TO RELATED APPLICATION

This application claims priority under 35 U.S.C. § 119(e) to U.S. Provisional Patent Application No. 62/566,822, filed Oct. 2, 2017, the contents of which are hereby incorporated in its entirety as if fully set forth herein.

BACKGROUND

Temperatures within cooking devices, such as stoves, ovens, grills, smokers, and the like, may decrease or increase during cooking. Variations in temperature may be gradual or may spike sharply. Further, some cooking devices may have temperate zones, such that the temperature varies from area to area within the cooking devices. This may cause food to cook unevenly, char, burn, or remain undercooked, which may result in a person eating the food to dislike the flavor or become ill.

Some cooking devices may include a temperature gauge and display device, but existing solutions may be unable to measure the temperature or temperatures within a cooking device and within the food and notify a cook or other user of the measurements while the user is at a remote location.

SUMMARY

The above needs and others may be addressed by certain embodiments or embodiment of the disclosed technology. Certain embodiments include systems and methods for detecting and monitoring temperatures and cook times associated with a cooking session and communicating such information to a location remote from the cooking environment.

Some embodiments can include a temperature gauge system for detecting temperatures and for monitoring a cooking session from a remote location. The temperature gauge system can include a processor, a communication interface, a temperature sensor, and memory storing instructions. When executed by the processor, the instructions can cause the temperature gauge system to receive temperature data from the temperature sensor, determine a cook time of a cooking session, and transmit, to a remotely located computing device and via the communication interface, the temperature data and the cook time.

Other embodiments, features, and aspects of the disclosed technology are described in detail herein and are considered a part of the claimed disclosed technology. Other embodiments, features, and aspects can be understood with reference to the following detailed description, accompanying drawings, and claims.

BRIEF DESCRIPTION OF THE FIGURES

Reference will now be made to the accompanying figures, wherein.

DETAILED DESCRIPTION

The present disclosure can be understood more readily by reference to the following detailed description of exemplary embodiments and the examples included herein. Before the exemplary embodiments of the devices and methods according to the present disclosure are disclosed and described, it is to be understood that embodiments are not limited to those described within this disclosure. Numerous modifications and variations therein will be apparent to those skilled in the art and remain within the scope of the disclosure. It is also to be understood that the terminology used herein is for the purpose of describing specific embodiments only and is not intended to be limiting. Some embodiments of the disclosed technology will be described more fully hereinafter with reference to the accompanying drawings. This disclosed technology may, however, be embodied in many different forms and should not be construed as limited to the embodiments set forth therein.

In the following description, numerous specific details are set forth. However, it is to be understood that embodiments of the disclosed technology may be practiced without these specific details. In other instances, well-known methods, structures, and techniques have not been shown in detail in order not to obscure an understanding of this description. References to "one embodiment," "an embodiment," "example embodiment," "some embodiments," "certain embodiments," "various embodiments," etc., indicate that the embodiment(s) of the disclosed technology so described may include a particular feature, structure, or characteristic, but not every embodiment necessarily includes the particular feature, structure, or characteristic. Further, repeated use of the phrase "in one embodiment" does not necessarily refer to the same embodiment, although it may.

Unless otherwise noted, the terms used herein are to be understood according to conventional usage by those of ordinary skill in the relevant art. In addition to any definitions of terms provided below, it is to be understood that as used in the specification and in the claims, "a" or "an" can mean one or more, depending upon the context in which it is used. Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

Unless otherwise specified, the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

To facilitate an understanding of the principles and features of the embodiments of the present disclosure, example embodiments are explained hereinafter with reference to their implementation in one or more illustrative embodiment(s). Such illustrative embodiment(s) are not, however, intended to be limiting.

The materials described hereinafter as making up the various elements of the embodiments of the present disclosure are intended to be illustrative and not restrictive. Many suitable materials that would perform the same or a similar function as the materials described herein are intended to be embraced within the scope of the example embodiments. Such other materials not described herein can include, but are not limited to, materials that are developed after the time of the development of the disclosed technology, for example.

Embodiments of the disclosed technology include a system configured to monitor a cooking session from a computing device, such as a personal computer, a phone, a tablet, a mobile device, or any other device configured to remotely interface with an embodiment of the temperature gauge described herein. Certain embodiments may be configured to monitor cook time and the temperature of the cooking device. Some embodiments may measure the temperature of various locations and may monitor temperature distribution and/or temperate regions within the cooking device. Some embodiments may be configured to monitor a cooking session from a laptop, desktop, or any other computer. Some embodiments may be an Internet of Things platform. Some embodiments may implement a serverless schema, which may use some or all of Amazon Web Services (AWS) IoT, AWS Shadows, AWS Lambda, AWS API Gateway, AWS DynamoDB, AWS S3, AWS Lambda Events, and AWS SNS. As will be appreciated, the term "serverless" refers to a cloud-based computing model in which a cloud provider (e.g., AWS) dynamically manages allocation of machine resources to act as the server for a customer.

Figure 1:
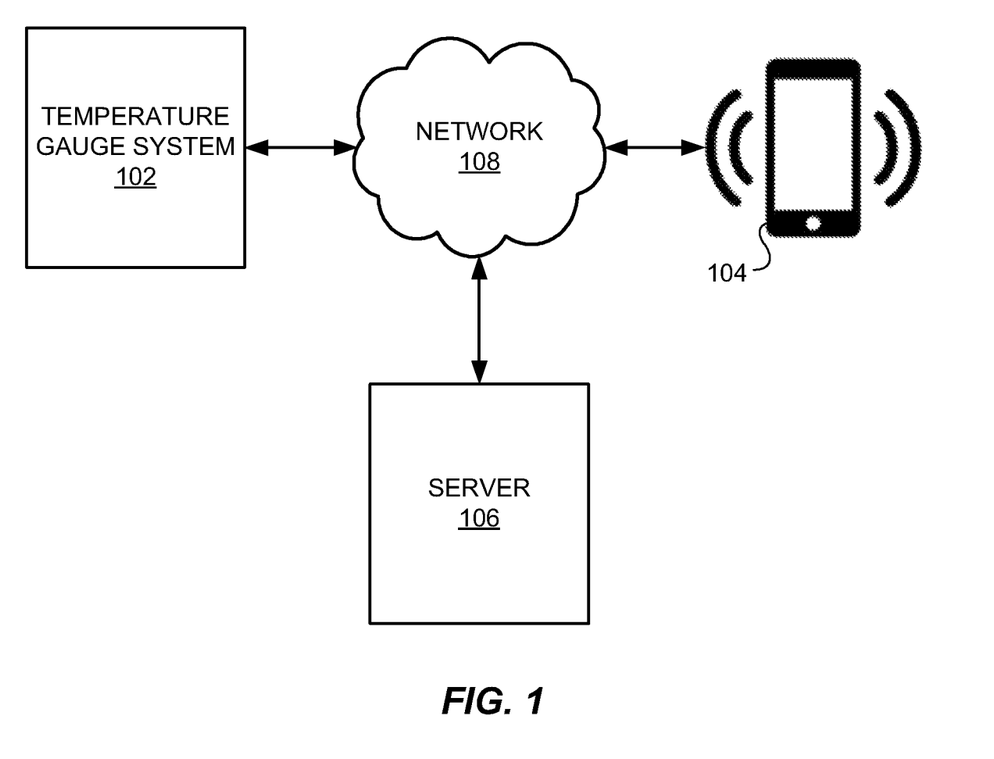
FIG. 1 is a diagram of an example temperature gauge system, according to some embodiments of the disclosed technology.
Figure 2:
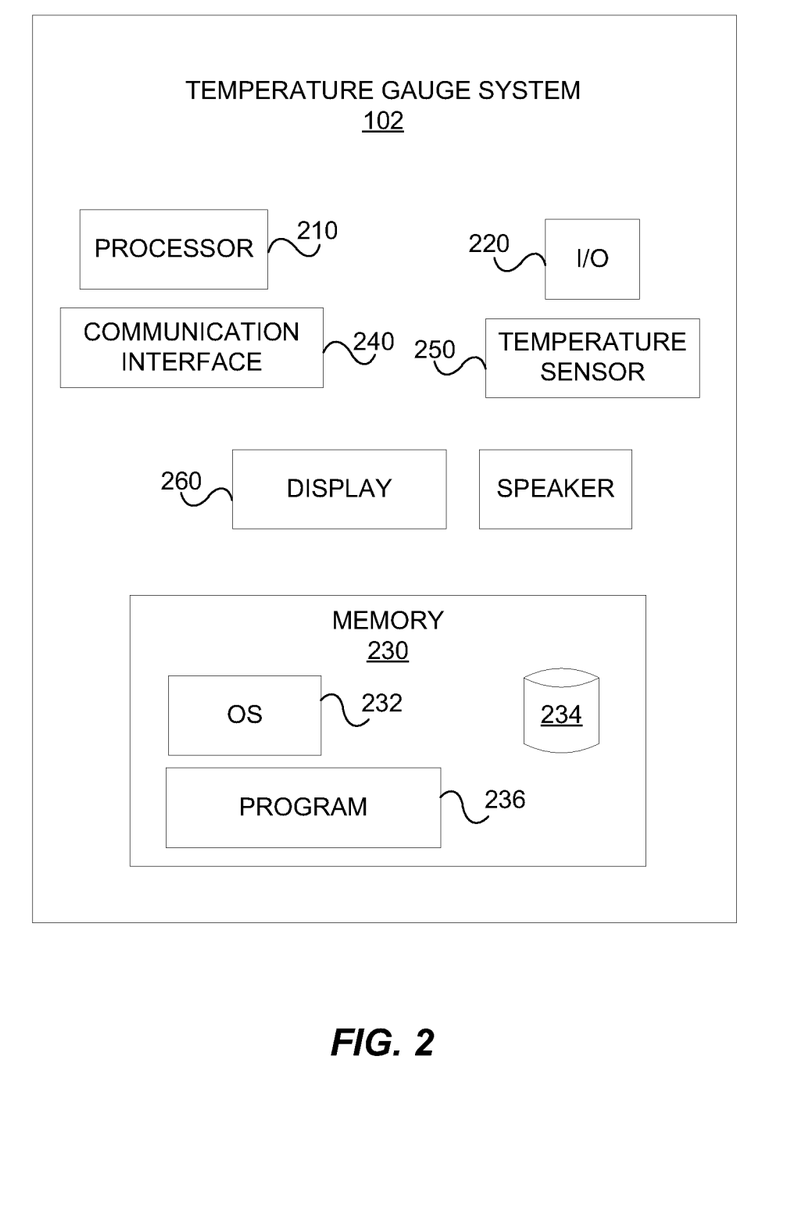
FIG. 2 is a schematic diagram depicting an example temperature gauge device, according to some embodiments of the disclosed technology.

Referring now to the figures, FIG. 1 depicts a temperature gauge system 100 in which a temperature gauge device 102 is configured to communicate with a computing device 104 and/or a server 106 such as via a network 108. FIG. 2 illustrates an example temperature gauge device 102. In some embodiments, the temperature gauge device 102 can include a processor 210, input/output (I/O) device 220, memory 230, communication interface 240, and temperature sensor 250. One of ordinary skill will recognize that these are merely examples, and a device for measuring and communicating temperature readings according to the present disclosure may not include all the depicted elements of temperature gauge device 102 and/or may include various additional or alternative elements. Memory 230 may store one or more of an operating device (OS) 232, a database 234, which may be any suitable repository of data, and a program 236. Communication interface 240 may include, for example, one or more of wireless or wired transmitter, receiver, and transceiver. In certain embodiments, the temperature gauge device 102 may include a user interface (U/I) device for receiving user input data, such as data representative of a click, a scroll, a tap, a press, a spatial gesture (e.g., as detected by an integrated digital camera), a voice command (e.g., as detected by an integrated microphone), or typing on an input device that can detect tactile inputs.

Some embodiments may include one or more temperature sensors 250 configured for a particular purpose. For example, some embodiments may include one or more temperature sensors 250 configured to measure ambient temperature (e.g., in a cooking enclosure or other cooking environment, such as an open fire); one or more temperatures sensors 250 configured to insert into, and measure an internal temperature of, meat or other foods (e.g., a meat probe); one or more temperature sensors 250 configured to attach to, and measure an external temperature of, meat or other foods; and/or one or more temperature sensors 250 configured to measure the temperature of an object located within the cooking environment, such as a pan or grill rack. In some embodiments, a particular temperature sensor 250 may include one or more of a thermocouple, a resistive temperature measuring device, a thermistor, an infrared sensor, a thermometer, or any other device capable of measuring temperature. Some embodiments may include two, three, four, five, six, or more temperature sensors 250. For example, some embodiments may include ten temperature sensors 250. A person of skill in the art will recognize that any number of temperature sensors 250 is herein contemplated. Some embodiments may include multiple types of temperature sensor 250. Some embodiments may include additional probes or sensors that may, for example, measure humidity or pressure within the cooking device.

In some embodiments, the temperature gauge device 102 may include a display 260. In some embodiments, the display may be configured to display a current temperature or an average temperature of one or more temperature sensors 250. In some embodiments, the display 260 may be configured to selectively display data corresponding to one or more sensors at a given time. The temperature gauge device 102 may be designed of materials that are able to withstand substantial heat, such that the temperature gauge device is operable to be placed in a cooking apparatus, including, but not limited to, a stove, an oven, a grill, and a smoker. In some embodiments, the temperature gauge device 102 may be a single, unitary apparatus, while in some embodiments, the temperature gauge device 102 can comprise multiple separate and independent parts, which may or may not directly communicate with one another. According to some embodiments, the temperature gauge device 102 can be configured to communicate with a computing device 104 and/or a server 106. As described below, the temperature gauge device 102 may be configured to communicate with various devices directly or via one or more networks 108. In certain embodiments, the temperature sensors 250 may be in wired or wireless connection with the communication interface 240 the temperature gauge device 102, and the communication interface 240 may be configured to communicate with the computing device 104 and/or server 106. In certain embodiments, one or more temperature sensors 250 may include their own dedicated communication interface such that the temperature sensors 250 are configured to remotely communicate with the communication interface 240, the computing device 104, and/or the server 106. In some embodiments, the temperature gauge device 102 may be configured to communicate via one or more of 3G, 4G, LTE, WiFi, HyperText Transfer Protocol (HTTP), Bluetooth, Near Field Communication (NFC), or any other useful method.

As described above and referring to FIG. 3, computing device 104 may include a processor 310, input/output (I/O) device 320, memory 330, communication interface 340, and display 350. Memory 330 may store one or more of an operating system (OS) 332, a database 334, which may be any suitable repository of data, and an application or program 336. Communication interface 340 may include, for example, one or more of wireless or wired transmitter, receiver, and transceiver. In some embodiments, the computing device 102 may be configured to communicate via one or more of 3G, 4G, LTE, WiFi, HTTP, Bluetooth, NFC, or any other useful method. The computing device 104 may include a user interface (U/I) device for receiving user input data, such as data representative of a click, a scroll, a tap, a press, a spatial gesture (e.g., as detected by an integrated digital camera), a voice command (e.g., as detected by an integrated microphone), or typing on an input device that can detect tactile inputs.

Figure 3:
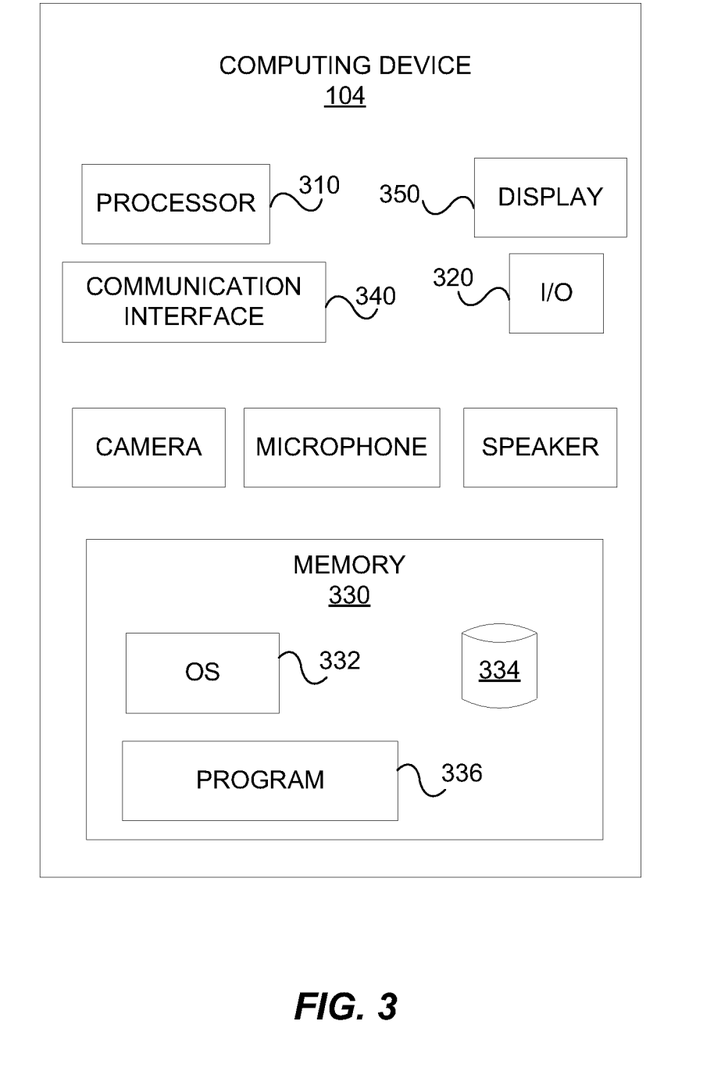
FIG. 3 is a schematic diagram depicting a computing device, according to some embodiments of the disclosed technology.

Processor 310 may include one or more of an application specific integrated circuit (ASIC), programmable logic device, microprocessor, microcontroller, digital signal processor, co-processor or the like or combinations thereof capable of executing stored instructions and operating upon stored data. Memory 330 may include, in some implementations, one or more suitable types of memory (e.g., volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like) for storing files including operating system 332, application programs 236 (including, for example, a web browser application, a widget or gadget engine, and or other applications, as necessary), executable instructions and data. In some embodiments, some or all of the processing techniques described herein can be implemented as a combination of executable instructions and data within memory 330. In certain embodiments, processor 310 may use logical processors to simultaneously execute and control multiple processes. One of ordinary skill in the art would understand that other types of processor arrangements could be implemented that provide for the capabilities disclosed herein.

Computing device 104 may include one or more storage devices 334 configured to store information used by processor 310 (or other components) to perform certain functions related to the disclosed embodiments. As an example, computing device 104 may include memory 330 that includes instructions to enable processor 310 to execute one or more applications (e.g., application 336), network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

In some embodiments, computing device 104 may include memory 330 that includes instructions that, when executed by processor 310, perform one or more processes consistent with the functionalities disclosed herein. Methods, systems, and articles of manufacture consistent with disclosed embodiments are not limited to separate programs or computers configured to perform dedicated tasks.

According to some embodiments, program 336 may be configured to provide a graphical user interface (GUI) on the display 350 of the computing device 104, and the program 336 may be configured to receive input from a user of the computing device 104, communicate with the temperature gauge device 102, and/or display information via the display 350. In some embodiments, the program 336 may be configured to run in the background such that the program 336 may perform various functions without being visible to a user. According to some embodiments, the program 336 can be configured to communicate, via the computing device 104, with the temperature gauge device 102 and/or the server 106.

In some embodiments, the program 336 may be configured to receive user input, via the computing device 102 and/or via the temperature gauge system 102, indicative of a target or desired cooking temperature, cooking temperature range, and/or cooking time for each respective temperature sensor 250. In certain embodiments, this information may additionally or alternatively be transmitted to the server 106. In some embodiments, a different target cooking temperature, cooking temperature range, and/or cooking time may be input for each respective temperature sensor 250. In some embodiments, the program 336 (and/or server 106) may receive data indicative of the food type and desired level of doneness (e.g., with respect to meat: well-done, medium-well, medium, medium-rare, rare) being measured by a respective temperature sensor 250 and, in some embodiments, may receive data indicative of the size (e.g., mass, thickness, weight) of the food item being measured. In some embodiments, the program 336 (or the server 106) may receive a photo of a food item and may determine, based on the photo of the food item, the type of food and size of the food item. In certain embodiments, the server 106 may receive a photo of a food item from a computing device 104 (e.g., a photo taken by a camera included in the computing device 104) and may compare the photo to a food photo database to determine the type of food and size of the food item. In some embodiments, the program 336 may receive audio data detected by a microphone of the computing device 104 (or the temperature gauge device 102), and the computing device 104 may perform natural language processing on the audio data to determine a meaning associated with the audio data. Alternatively or in addition, the computing device 104 may be configured to transmit the audio data to the server 106, which may be configured to perform natural language processing on the audio data. According to some embodiments, the audio data may be indicative of, e.g., the type of food corresponding to a particular temperature sensor 250, the desired cook time for one or more food items, the level of doneness for one or more food items, the level of char for one or more food items, the desired temperature or temperature range for one or more temperature sensors, user preferences, or any other useful information.

In certain embodiments, the server 106 may maintain a user profile database, which, for each user account, can include cooking preference data indicative of a user's cooking preferences (e.g., level of doneness, amount of char) for various food items (preferences can differ by, for example, type of food item, cut of meat, etc.), and responsive to determining a food type, the server 106 may be configured to calculate a desired internal food temperature, external food temperature, local ambient cooking environment temperature, average ambient cooking environment temperature, cooking surface temperature, and/or cook time. The server 106 may be configured to transmit, to the computing device 104, one or more of the calculated cook temperatures and/or calculated cook times, such that the program 336 can dynamically suggest or enter a cooking time that has been calculated (by the program 336 or the server 106) to achieve the stored cooking preferences for the corresponding food item. In some embodiments, the program 336 and/or the server 106 may be configured to monitor a total cooking time associated with the amount of time a cooking environment has had a temperature or an average temperature within a predetermined range and/or a respective cook time associated with each temperature sensor 250.

Regardless of which device (e.g., computing device 104 or server 106) monitors or calculates the various cook times and temperatures, this data may be communicated among various devices described herein. In some embodiments, the program 336 and/or the temperature gauge device 102 may be configured to provide an alarm when certain alarm conditions are met. In some embodiments, the alarm may include a visual indication, such as by a corresponding display, or an audible indication, such as by a speaker integrated into the temperature gauge device 102 or the computing device 104.

Various operating modes of the program 336 are described herein. As will be described more fully below, in certain embodiments, the temperature gauge device 102 may be configured to communicate with a computing device 104 running the program 336 via the network 106 (e.g., over the internet) or directly without an intermediary network.

Direct Mode

According to some embodiments, the temperature gauge device 102 and the program 336 may operate in a Direct Mode in which the temperature gauge device 102 and the computing device 104 can communicate directly with one another. In some embodiments, Direct Mode may allow the temperature gauge system 102 and the computing device 104 to communicate with one another without the need of the network 106 (e.g., without a WiFi network). In certain embodiments, Direct Mode can provide a one-to-one connection, such that a single temperature gauge system 102 is in communication with a single computing device 104. In certain embodiments, Direct Mode can provide a direct connection between a single temperature gauge system 102 and multiple computing devices 104, between a single computing device 102 and multiple temperature gauge systems 104, or between multiple temperature gauge systems 102 and multiple computing devices 104. In some embodiments, the temperature gauge system 102 and the computing device 104 can communicate via Bluetooth, NFC, a hotspot provided by the computing device 104 or the temperature gauge system 102, or any other suitable method.

Figure 4:
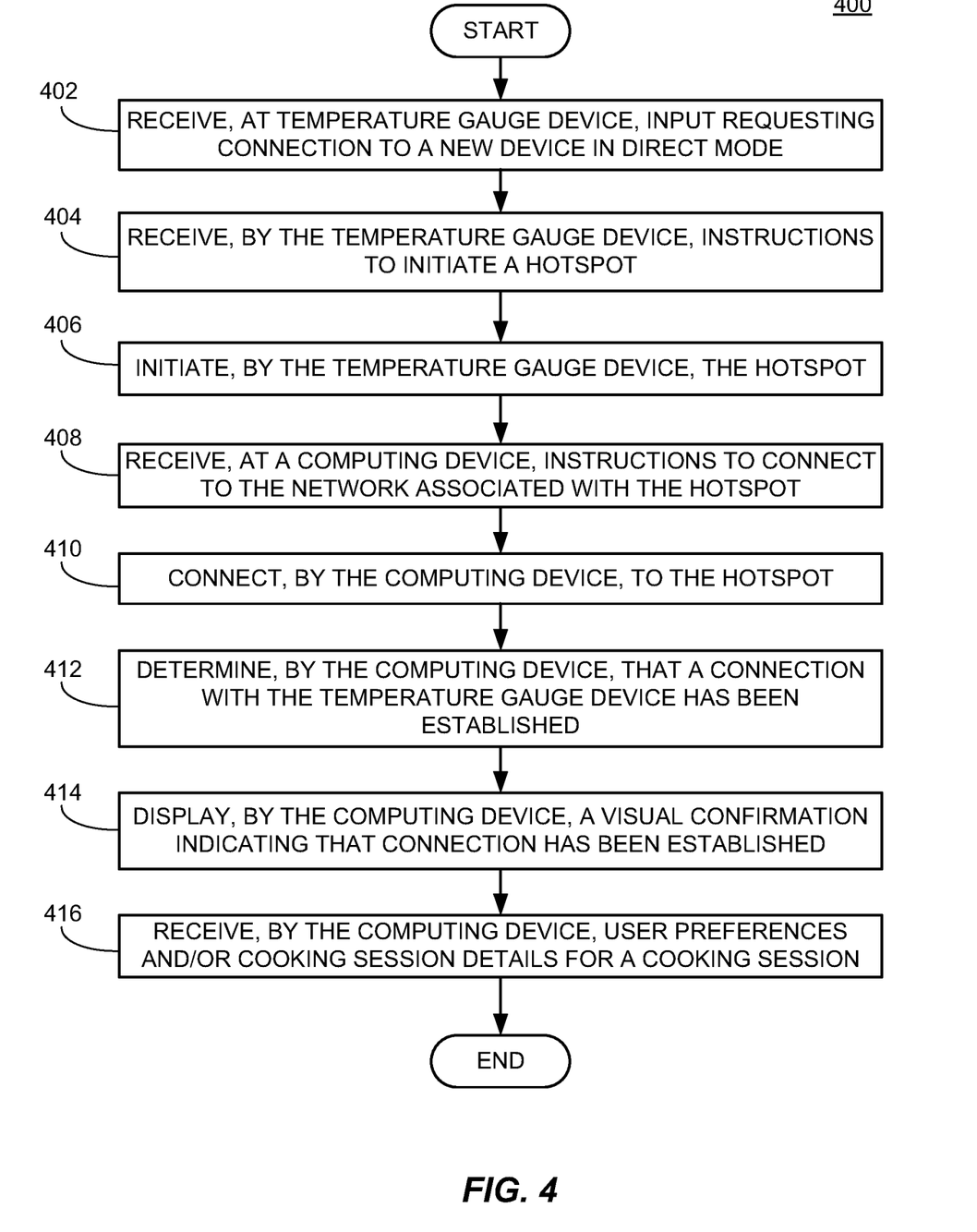
FIG. 4 is a process diagram illustrating an example method of establishing communication between a temperature gauge device and a computing device, according to some embodiments of the disclosed technology.

FIG. 4 depicts an example method 400 in which a temperature gauge device 102 and a computing device 104 can enter Direct Mode, according to some embodiments. In block 402, the temperature gauge device 102 can receive, user input requesting the temperature gauge device 102 to connect with a new device in Direct Mode. In some embodiments, the program 336 can cause the display 350 of the computing device 104 to display pairing instructions, and/or the temperature gauge device 102 may display, via an integrated display, pairing instructions. According to some embodiments and as shown in block 404, the temperature gauge device 102 can receive instructions to initiate a hotspot function, and in block 406, the temperature gauge device 102 can initiate the hotspot. In block 408, the computing device 104 can receive, from a user, instructions to connect to the network established by the hotspot function of the temperature gauge device 102. In block 410, the computing device 104 can connect to the hotspot network provided by the temperature gauge device 102. In block 412, the program 336 can determine that a connection with the temperature gauge device 102 has been established, and in block 414 the program can display, via the display 350 of the computing device, a visual confirmation indicating that the temperature gauge device 102 and computing device 104 are connected.

In block 416, the program 336 can receive user preferences or cooking session details for a cooking session involving one or more food items. For example, the program 336 can receive input indicative of a target cooking temperature, cooking temperature range, and/or cooking time for each respective temperature sensor 250 that is in communication with the temperature gauge device 102. In some embodiments, the program 336 may be configured to receive user input, via the computing device 102 and/or via the temperature gauge system 102, indicative of the target cooking temperature, cooking temperature range, and/or cooking time for each respective temperature sensor 250. In certain embodiments, this information may additionally or alternatively be transmitted to the server 106. In some embodiments, other information may be conveyed to the program 336, either dynamically as described herein or as received manual user input, such as data indicative of the food type and desired level of doneness (e.g., with respect to meat: well-done, medium-well, medium, medium-rare, rare) being measured by a respective temperature sensor 250, data indicative of the size (e.g., mass, thickness, weight) of the corresponding food item, temperature preferences, other cooking preferences, or any other useful information. In some embodiments, the program 336 may be configured to locally store, on a storage device 334 of the computing device 104, data corresponding to the temperature gauge devices 102.

Once the Direct Mode has been set up, some embodiments may include a Direct Mode Foreground Operation (i.e., the GUI is displayed) and/or a Direct Mode Background Operation (i.e., the GUI is not displayed). In some embodiments, the Direct Mode Foreground Operation and the Direct Mode Background Operation may refer to two independent sub-processes that occur in parallel.

Figure 5:
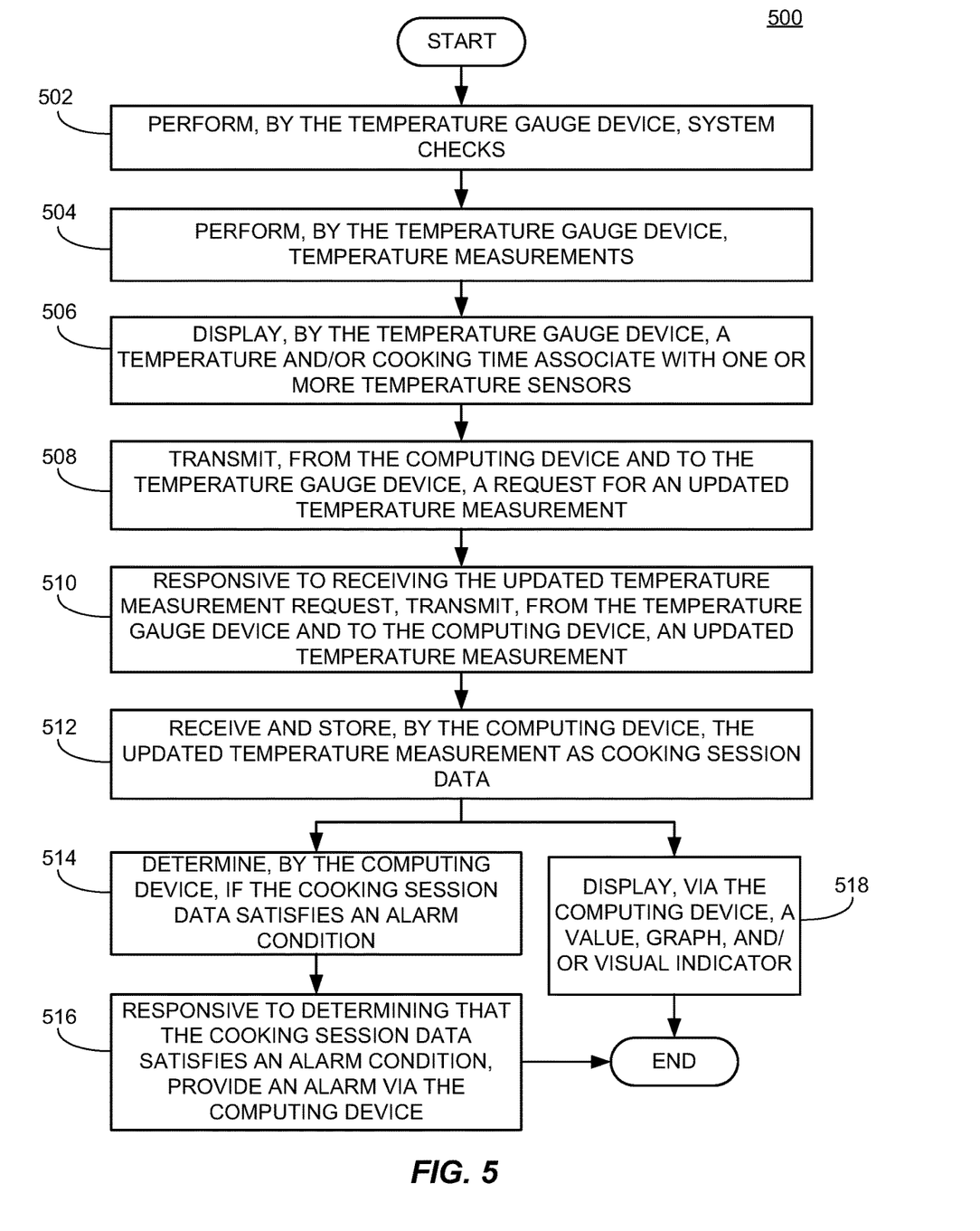
FIG. 5 is a process diagram of an example method in which a program can operate in the foreground of a computing device and in which the computing device can communicate directly with a temperature gauge device, according to some embodiments of the disclosed technology.

According to some embodiments, and as shown in FIG. 5, an example Direct Mode Foreground Operation 500 may include the following steps. As shown in block 502, in some embodiments, the temperature gauge device 102 can perform system checks to determine that all necessary functionalities are sufficiently operational. In block 504, the temperature gauge device 102 can perform temperature measurements, which can be stored locally and/or transmitted to the computing device 104 (or to the server 106 via the computing device 104). In some embodiments, the temperature gauge device 102 may be configured to store a predetermined number of most recent temperature readings for one, some, or all temperature sensors 250. In block 506, the temperature gauge device 102 can be configured to display, on an integrated display, a current temperature of one or more temperature sensors 250 and/or a cooking time (e.g., durational count and/or count-down timer) associated with one or more respective temperature sensors 250.

In some embodiments, an example Direct Mode Foreground Operation 500 may include the following steps. In block 508, the program 336 can cause the computing device 104 transmit, to the temperature gauge device 102, a request for an updated temperature measurement corresponding to one or more temperature sensors 250. In some embodiments, the program 336 may be configured to transmit a request for an updated temperature measurement on a predetermined basis, for example, every one, two, three, five, ten, or more seconds. In some embodiments, the program 336 may be configured to transmit a request for an updated temperature measurement if the computing device 104 has not received an updated temperature measurement for a predetermined amount of time (i.e., if the computing device has not received an updated temperature measurement that was affirmatively sent by the temperature gauge device 102 without request from the computing device 104). In block 510, responsive to receiving a request from the computing device 104, the temperature gauge device 102 can transmit, to the computing device 104, one or more updated temperature measurements. In block 512, the computing device 104 can receive the updated temperature measurements and store the updated temperature measurements as cooking session data. In block 514, the computing device 104 can determine if the cooking session data is outside a range of predetermined limits and/or satisfy a predetermined alarm condition, as described herein. In block 516, responsive to determining that an alarm condition is satisfied, the program 336 can cause the computing device 104 to provide an alert, such as by a visual notification (e.g., on display 350), an audible alarm (e.g., via an integrated or remote speaker), vibration of the mobile device, or any other useful alert functionality. In some embodiments, an alarm condition may be met if a detected temperature is outside a predetermined range, inside a predetermined range, or if a predetermined amount of time has expired. In block 518, the program 336 can cause the computing device 104 to display one or more of a value, a graph, a visual indicator (e.g., color), or any other information indicative of the cooking session data.

Figure 6:
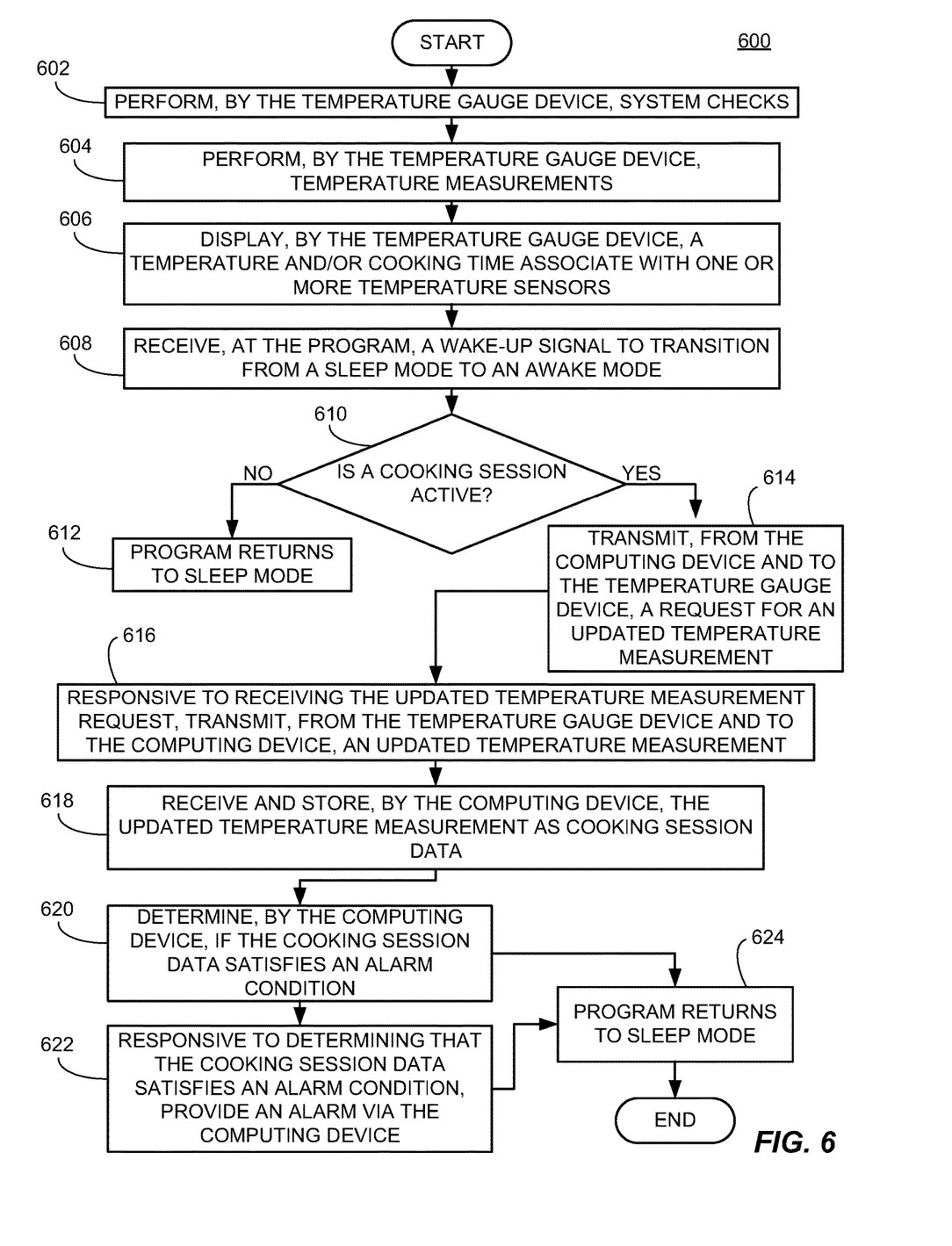
FIG. 6 is a process diagram of an example method in which a program can operate in the background of a computing device and in which the computing device can communicate directly with a temperature gauge device, according to some embodiments of the disclosed technology.

According to some embodiments, and as shown in FIG. 6, an example Direct Mode Background Operation 600 may include the following steps. As shown in block 602, in some embodiments, the temperature gauge device 102 can perform system checks to determine that all necessary functionalities are sufficiently operational. In block 604, the temperature gauge device 102 can perform temperature measurements, which can be stored locally and/or transmitted to the computing device 104 and/or the server 106. In some embodiments, the temperature gauge device 102 may be configured to store a predetermined number of most recent temperature readings for one, some, or all temperature sensors 250. In block 606, the temperature gauge device 102 can be configured to display, on an integrated display, a current temperature of one or more temperature sensors 250 and/or a cooking time (e.g., durational counting and/or a count-down timer) associated with one or more respective temperature sensors 250.

In some embodiments, an example Direct Mode Foreground Operation 600 may include the following steps. In block 608, the program 336 can receive, from or via the computing device 102, a wake-up signal to cause the program 336 to transition from a sleep mode to an awake mode. In some embodiments, the sleep mode may involve the program 336 to suspend some functionalities such that the program 336 requires a comparatively low amount power. In some embodiments, the program 336 can be configured to automatically awaken from sleep mode on a predetermined, recurring basis. In block 610, the program can determine whether a cooking session is active. In some embodiments, the temperature data gathering process can determine whether a cooking session is active. If no cooking session is active, the program 336 can return to sleep mode, as shown in block 612. In block 614, if there is an active cooking session, the program 336 can cause the computing device to transmit, to the temperature gauge device 102, a request for an updated temperature measurement. In block 616, responsive to receiving a request from the computing device 104, the temperature gauge device 102 can transmit, to the computing device 104, one or more updated temperature measurements. In block 618, the computing device 104 can receive the updated temperature measurements and store the updated temperature measurements as cooking session data. In block 620, the computing device 104 can determine if the cooking session data is outside a range of predetermined limits and/or satisfy a predetermined alarm condition, as described herein. In block 622, responsive to determining that an alarm condition is satisfied, the program 336 can cause the computing device 104 to provide an alert, such as by a visual notification (e.g., on display 350), an audible alarm (e.g., via an integrated or remote speaker), vibration of the mobile device, or any other useful alert functionality. In block 624, the program 336 can return to sleep mode.

Indirect Mode

According to some embodiments the gauge device and mobile device may operate in Indirect Mode such that the gauge device and the mobile device can indirectly communicate via network 108, (e.g., the internet). In some embodiments, the temperature gauge device 102 can communicate with one or more servers 106 via a network 108, such as a WiFi network. In some embodiments, various devices of the temperature gauge system 100 may communicate with and/or via an intermediary service (e.g., AWS services). In certain embodiments, the temperature gauge device 102 and the computing device 104 may operate in a many-to-many connection such that one or more computing device 104 may be in simultaneous communication with one or more temperature gauge device 102.

Figure 7:
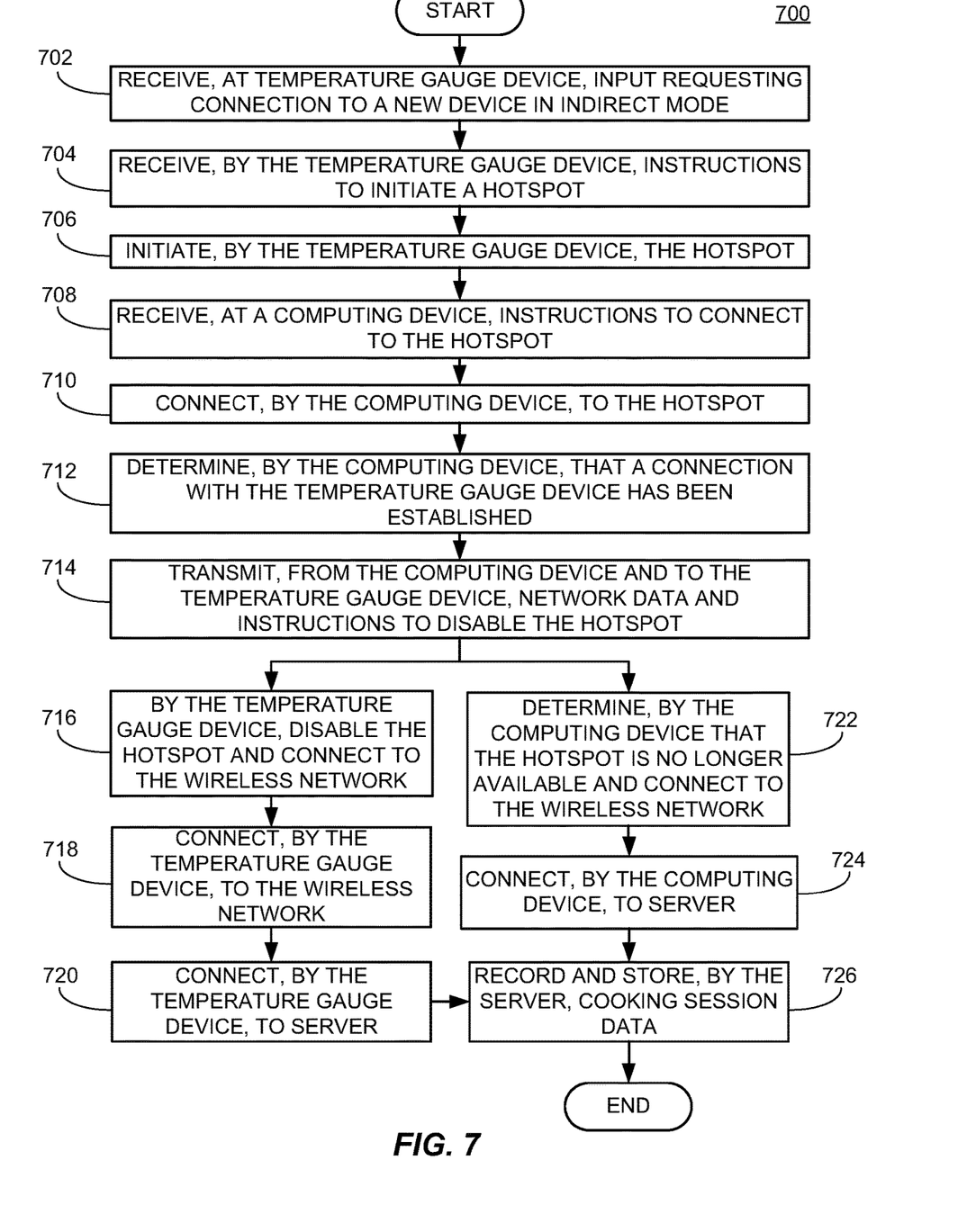
FIG. 7 is a process diagram illustrating an example method of establishing communication, via a network, between a temperature gauge device, a computing device, and a server, according to some embodiments of the disclosed technology.

In some embodiments, and as shown in FIG. 7, Indirect Mode may include a provisioning process 700 such that the computing device 104 and the temperature gauge device 102 can be paired in indirect communication. According to some embodiments, the provisioning process 700 may include the following steps. In block 702, the temperature gauge device 102 can receive, user input requesting the temperature gauge device 102 to connect with a new device in Indirect Mode. In some embodiments, the program 336 can cause the display 350 of the computing device 104 to display pairing instructions, and/or the temperature gauge device 102 may display, via an integrated display, pairing instructions. According to some embodiments and as shown in block 704, the temperature gauge device 102 can receive instructions to initiate a hotspot function, and in block 706, the temperature gauge device 102 can initiate the hotspot. In block 708, the computing device 104 can receive, from a user, instructions to connect to the network established by the hotspot function of the temperature gauge device 102. In block 710, the computing device 104 can connect to the hotspot network provided by the temperature gauge device 102. In block 712, the program 336 can determine that a connection with the temperature gauge device 102 has been established. In some embodiments, the program can display, via the display 350 of the computing device, a visual confirmation indicating that the temperature gauge device 102 and computing device 104 are connected.

In block 714, the computing device can transmit, to the temperature gauge device 102, instructions to disable the hotspot, and the computing device 104 can transmit, to the temperature gauge device 102, network data indicative of access credentials corresponding to a wireless network 108 to which the temperature gauge device 102 will connect. In block 716, the temperature gauge device 102 can disable the hotspot, and in block 718, the temperature gauge device 102 can connect to the wireless network 108. In block 720, the temperature gauge unit 102 can connect to the server 106 via the wireless network 108. In block 722, responsive to determining that the hotspot is no longer available, the computing device 104 can connect to the wireless network 108, and in block 724, the computing device 104 can connect to the server 106 via the wireless network 108. In block 726, the server 106 can store device details for the temperature gauge device 102 and/or the computing device 104 and can associate the device(s) to a user account associated with the program 336. In some embodiments, server 106 can record and store cooking session data for a user to compile historical cooking session data. In some embodiments, the historical cooking session data may include user ratings, user comments, photos, or other data indicative of the results of a corresponding cooking session.

Once Indirect Mode has been set up, some embodiments may include an Indirect Mode Foreground Operation (i.e., the GUI is displayed) and/or an Indirect Mode Background Operation (i.e., the GUI is not displayed). The Indirect Mode Foreground Operation and the Indirect Mode Background Operation may be two independent sub-processes that occur in parallel.

Figure 8:
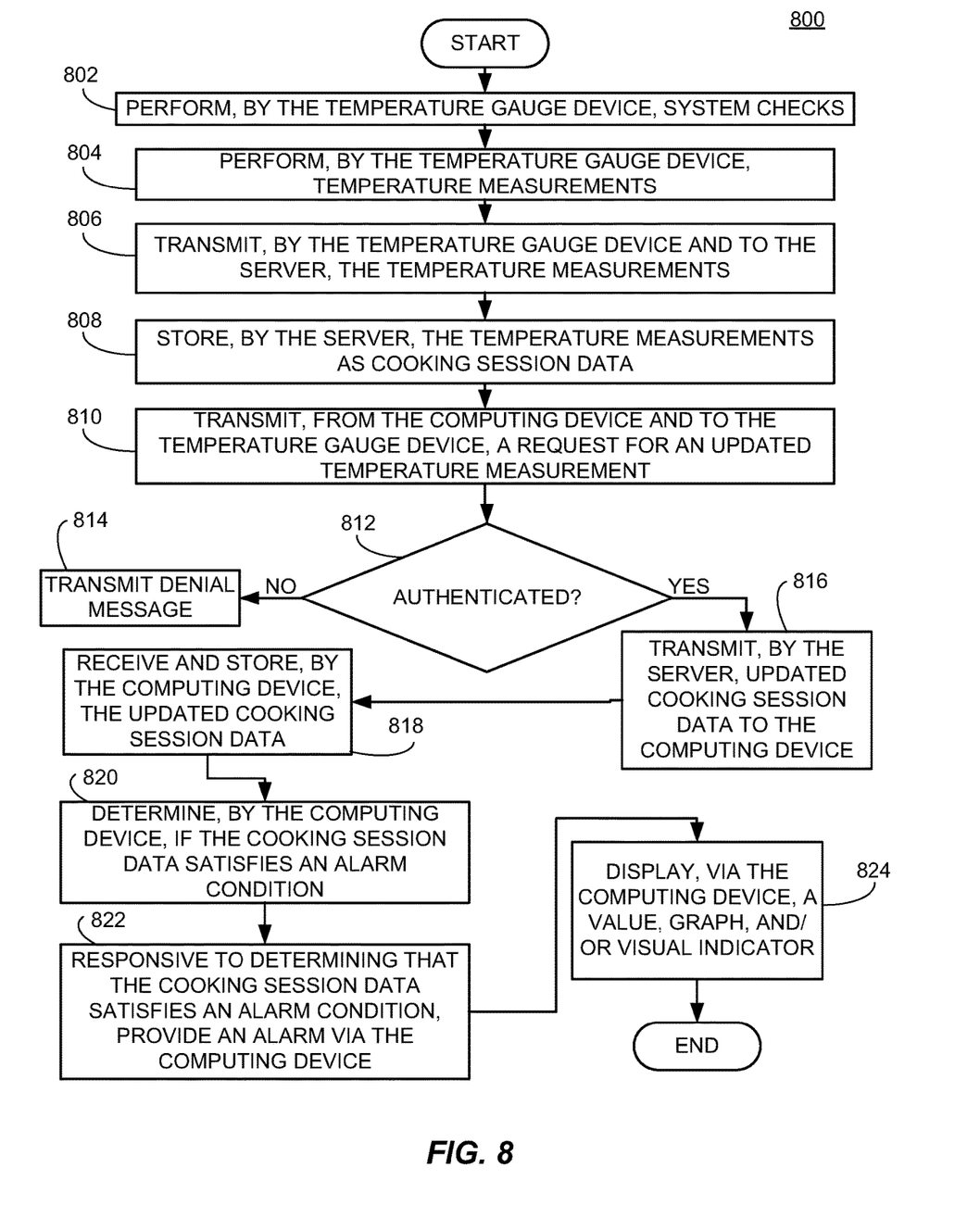
FIG. 8 is a process diagram of an example method in which a program can operate in the foreground of a computing device and in which the computing device, a temperature gauge device, and a server can communicate via a network, according to some embodiments of the disclosed technology.

According to embodiments, and as shown in FIG. 8, the Indirect Mode Foreground Operation may include the following steps of a first sub-process, which occur at the mobile device:

As shown in block 802, in some embodiments, the temperature gauge device 102 can perform system checks to determine that all necessary functionalities are sufficiently operational. In block 804, the temperature gauge device 102 can perform temperature measurements, and in block 806, the temperature gauge device 102 can transmit the temperature measurements to the computing device 104 and/or the server 106 via the network 108. In block 808, the server can be configured to store the temperature measurements as cooking session data.

In some embodiments, the program 336 may be configured to periodically request updated temperature measurements according to a predetermined amount of time. In block 810, when the program 336 has determined that a predetermined amount of time has passed such that updated temperature measurements are required, the computing device 104 can transmit, to the server 106, a request for updated cooking session data including the updated temperature measurements. In block 812, the server 106 can determine whether the program 336 (e.g., a user account associated with the program 336, the computing device 104 or the temperature gauge device 102 associated with the program 336) is authenticated to receive the cooking session data. In some embodiments, the server 106 may perform various authentication methods (e.g., username/password authentication) to determine whether the program 336 or a corresponding device or user account is authenticated.

In block 814, if the program 336 is not authenticated, the server 106 can transmit a denial message to the computing device 104. In block 816, if the program 336 is authenticated, the server can transmit updated cooking session data to the computing device 104. In block 818, the computing device 104 can receive the updated cooking session data and store the updated cooking session data on local storage device 334. In block 820, the computing device 104 can determine if the cooking session data is outside a range of predetermined limits and/or satisfy a predetermined alarm condition, as described herein. In block 822, responsive to determining that an alarm condition is satisfied, the program 336 can cause the computing device 104 to provide an alert, such as by a visual notification (e.g., on display 350), an audible alarm (e.g., via an integrated or remote speaker), vibration of the mobile device, or any other useful alert functionality. In block 824, the program 336 can cause the computing device 104 to display one or more of a value, a graph, a visual indicator (e.g., color), or any other information indicative of the cooking session data.

Figure 9:
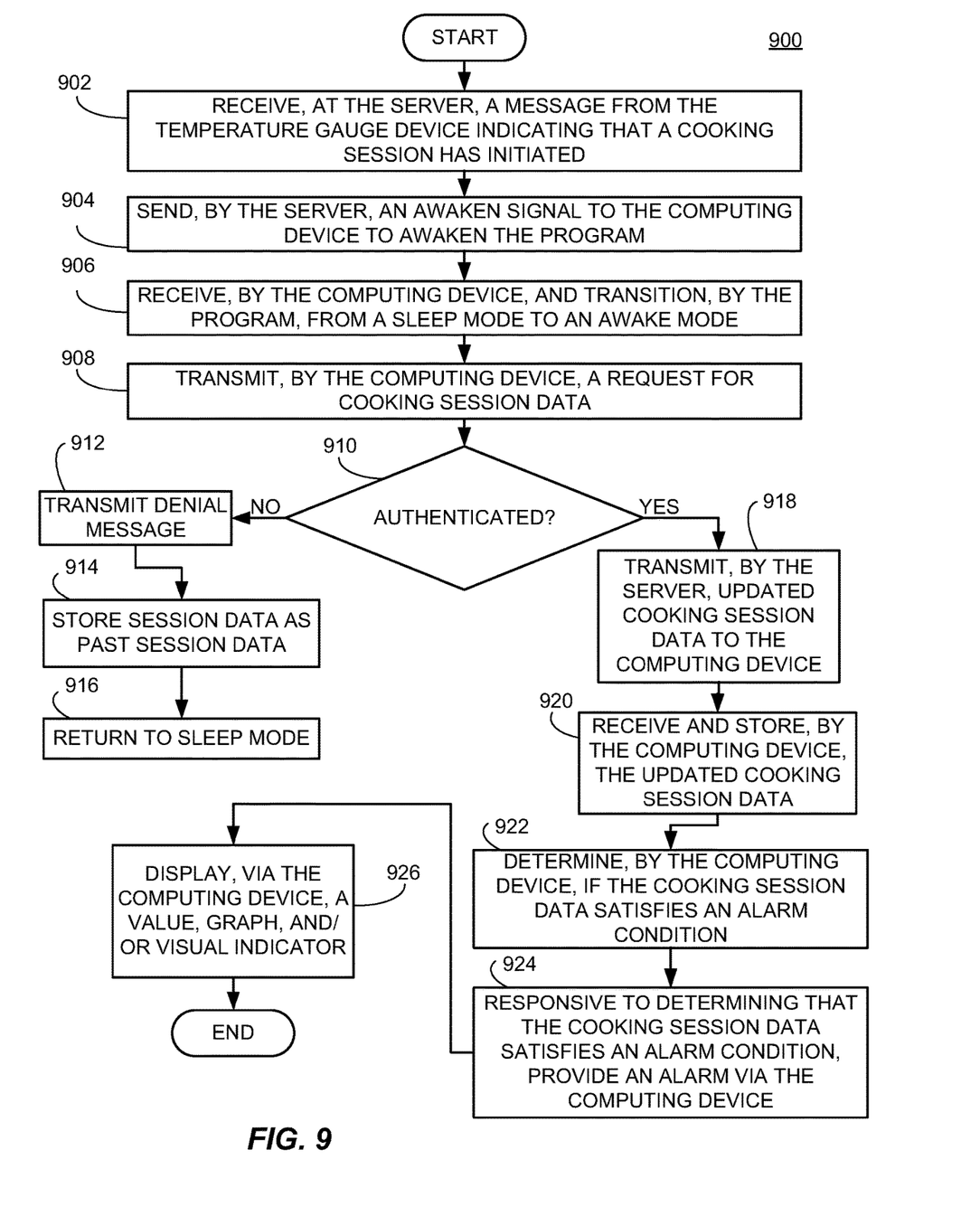
FIG. 9 is a process diagram of an example method in which a program can operate in the background of a computing device and in which the computing device, a temperature gauge device, and a server can communicate via a network, according to some embodiments of the disclosed technology.

According to some embodiments, and as shown in FIG. 9, an example Indirect Mode Background Operation 900 may include the following steps. In block 902, the server 106 can receive a message from the temperature gauge device 102 indicating that a cooking session has initiated. In block 904, the server 106 can send an awaken signal to the program 336 instructing the program 336 to transition from a sleep mode to an awake mode. In block 906, the program 336 can receive the awaken signal and can transition to the awake mode. In block 908, the program 336 can transmit a request to the server 106 for cooking session data included updated temperature readings. In block 910, the server 106 can determine whether the program 336 (e.g., a user account associated with the program 336, the computing device 104 or the temperature gauge device 102 associated with the program 336) is authenticated to receive the cooking session data. In some embodiments, the server 106 may perform various authentication methods (e.g., username/password authentication) to determine whether the program 336 or a corresponding device or user account is authenticated.

In block 912, if the program 336 is authenticated, the server 106 can transmit a denial message to the computing device 104. In block 914, the program 336 can store session data indicative of the awaken signal and the denial message as past session data, and in block 916, the program 336 can return to sleep mode.

In block 916, if the program 336 is authenticated, the server can transmit updated cooking session data to the computing device 104. In block 918, the computing device can receive and store the updated cooking session data at storage device 334. In block 920, the computing device 104 can determine if the cooking session data is outside a range of predetermined limits and/or satisfy a predetermined alarm condition, as described herein. In block 922, responsive to determining that an alarm condition is satisfied, the program 336 can cause the computing device 104 to provide an alert, such as by a visual notification (e.g., on display 350), an audible alarm (e.g., via an integrated or remote speaker), vibration of the mobile device, or any other useful alert functionality. In block 924, the program 336 can cause the computing device 104 to display one or more of a value, a graph, a visual indicator (e.g., color), or any other information indicative of the cooking session data. In block 926, the program 336 can determine that the cooking session has ended, and in block 928, the program 336 can return to sleep mode.

While certain embodiments of the disclosed technology have been described in connection with what is presently considered to be the most practical embodiments, it is to be understood that the disclosed technology is not to be limited to the disclosed embodiments, but on the contrary, is intended to cover various modifications and equivalent arrangements included within the scope of the appended claims. Various features and functionalities discussed with respect to a particular device may, in some embodiments, be accomplished or performed by one or more other devices described herein. For example, certain functionalities described as being performed by the computing device 104 and/or program 336 may, in some embodiments, be performed by the temperature gauge device 102, and certain functionalities described as being performed by the server 106 may be performed by the temperature gauge device 102 and/or the computing device 104. Although specific terms are employed herein, they are used in a generic and descriptive sense only and not for purposes of limitation.

This written description uses examples to disclose certain embodiments of the disclosed technology, including the best mode, and also to enable any person skilled in the art to practice certain embodiments of the disclosed technology, including making and using any devices or systems and performing any incorporated methods. The patentable scope of certain embodiments of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A temperature gauge device comprising:
   a processor;
   a communication interface;
   a first temperature sensor configured to measure an internal food temperature;
   a second temperature sensor configured to measure a cooking environment temperature; and
   memory storing instructions that, when executed by the processor, cause the temperature gauge device to:
      receive, from a user device, (i) a request to connect to the user device and (ii) instructions to initiate a hotspot network;
      initiate, via the communications interface, the hotspot network;
      connect, via the hotspot network, to the user device;
      receive, from the user device, (i) access credentials associated with a wireless network and (ii) instructions to disable the hotspot network;
      disable the hotspot network according to the instructions to terminate communication between the temperature gauge device and the user device via the hotspot network;
      connect, using the access credentials and via the communications interface, to a remotely located computing device over the wireless network;
      receive temperature data from the first and second temperature sensors;
      determine, based at least in part on the temperature data, cook time data associated with a cook time of a cooking session; and
      transmit, to a remotely located computing device and over the wireless network, the temperature data and the cook time data for delivery to and output on the user device.

2. The temperature gauge device of claim 1, wherein the communication interface is configured to communication with the computing device over the wireless network.

3. The temperature gauge device of claim 1, wherein the first temperature sensor additionally measures humidity and pressure.

4. The temperature gauge device of claim 1, wherein the communication interface is configured to communicate via one or more of 3G, 4G, LE, WiFi, Hypertext Transfer Protocol (HTTP), Bluetooth, and Near Field Communication (NFC).

5. The temperature gauge device of claim 1, wherein the first and second temperature sensors comprise at least one of: a thermocouple, a resistive temperature measuring device, a thermistor, an infrared sensor, and a thermometer.

6. The temperature gauge device of claim 1, wherein the first and second temperature sensors are in wireless communication with the processor.

7. The temperature gauge device of claim 1, wherein the first and second temperature sensors are in wireless communication with a wireless network.

8. The temperature gauge device of claim 1, wherein the second temperature sensor is configured to be disposed proximate an open flame.

9. The temperature gauge device of claim, wherein the second temperature sensor is configured to be disposed proximate a pan or grill rack.

10. The temperature gauge device of claim 1 further comprising a speaker and a microphone.

11. The temperature gauge device of claim 10, wherein the instructions, when executed by the processor, further cause the temperature gauge system to:
   identify an alarm condition corresponding to at least one of:
      temperature data detected by one of the first or second temperature sensors corresponding to a temperature that is outside a predetermined range;
      temperature data detected by one of the first or second temperature sensors corresponding to a temperature that is inside a predetermined range; and
      expiration of a predetermined amount of time; and
   responsive to identifying an alarm condition, emitting an audible alert by the speaker.

12. The temperature gauge device of claim 11 further comprising a display, wherein the instructions, when executed by the processor, further cause the temperature gauge system to display a visible alert on the display responsive to identifying the alarm condition.

13. The temperature gauge device of claim 1, further comprising a display configured to display data indicative of a temperature of at least one of the first or second temperature sensors.

* * * * *